(12) United States Patent
Muramatsu et al.

(10) Patent No.: US 7,721,097 B2
(45) Date of Patent: May 18, 2010

(54) INFORMATION RECORDING MEDIUM, AND INFORMATION RECORDING APPARATUS AND METHOD

(75) Inventors: Eiji Muramatsu, Saitama (JP); Shoji Taniguchi, Saitama (JP); Kunihiko Horikawa, Saitama (JP); Masahiro Kato, Saitama (JP); Toshio Suzuki, Saitama (JP); Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 1080 days.

(21) Appl. No.: 11/395,174

(22) Filed: Apr. 3, 2006

(65) Prior Publication Data

US 2007/0086292 A1    Apr. 19, 2007

Related U.S. Application Data

(62) Division of application No. PCT/JP2004/014486, filed on Oct. 1, 2004.

(30) Foreign Application Priority Data

Oct. 3, 2003 (JP) ............................. 2003-345903

(51) Int. Cl.
*G11B 7/00* (2006.01)
*H04L 9/32* (2006.01)
*G06F 17/00* (2006.01)
(52) U.S. Cl. .................... 713/168; 707/100; 369/124.03
(58) Field of Classification Search ................ 707/100; 713/168; 369/124.03
See application file for complete search history.

(56) References Cited

U.S. PATENT DOCUMENTS

2003/0063535 A1    4/2003 Shoji et al.

(Continued)

FOREIGN PATENT DOCUMENTS

EP           1 244 096 A2    9/2002

(Continued)

OTHER PUBLICATIONS

Operating Range Optimization of a Slider With an Integrated Microactuator (SLIM) for Hard Disk Drives; Dinulovic, D.; Pape, F.; Saalfeld, H.; Kurniawan, W.; Obermeier, E.; Gatzen, H.H.; Magnetics, IEEE Transactions on vol. 45, Issue 10, Oct. 2009 pp. 3769-3772.*

(Continued)

*Primary Examiner*—David Y Jung
(74) *Attorney, Agent, or Firm*—Young & Thompson

(57) ABSTRACT

A disc-shaped information recording medium includes a first recording layer (L0 layer) having (I) a first trial write area (101P-1) for trial write of first trial write information for calibration of the laser beam along the first track path (TP1) from the inner circumference toward the outer circumference and (II) a first recording area for recording the first recording information along a first track path (TP1), in this order from the inner circumference side. Furthermore, the disc-shaped information recording medium includes a second recording layer (L1 layer) having (I) a second trial write area (101P-2) for trial write of second trial write information for calibration of the laser beam along the second track path (TP2) from the outer circumference toward the inner circumference and (II) a second recording area for recording the second recording information along a second track path (TP2), in this order from the inner circumference side.

2 Claims, 8 Drawing Sheets

U.S. PATENT DOCUMENTS

2004/0085874 A1   5/2004   Akiyama et al.

FOREIGN PATENT DOCUMENTS

| EP | 1 318 509 A1 | 6/2003 |
|---|---|---|
| EP | 1 329 880 A2 | 7/2003 |
| EP | 1 492 098 A2 | 12/2004 |
| JP | 1 244 096 | 9/2002 |
| JP | 2002-358648 | 12/2002 |
| JP | 2004-295940 | 10/2004 |

OTHER PUBLICATIONS

Detection and sizing of particulate contamination in rigid disk drives: instruments and sampling techniques; Bhushan, B.; Chandra, S.; Magnetics, IEEE Transactions on vol. 35, Issue 2, Part 1, Mar. 1999 pp. 956-962.*

Identifying the effects of extinction ratio and substrate birefringence on magneto-optic Kerr effect measurements; Mendez, A.J.; Bergthold, P.; Instrumentation and Measurement Technology Conference, 1991. IMTC-91. Conference Record., 8th IEEE May 14-16, 1991 pp. 442-443.*

* cited by examiner

INFORMATION RECORDING MEDIUM, AND INFORMATION RECORDING APPARATUS AND METHOD

TECHNICAL FIELD

The present invention relates to an information recording medium, such as a DVD, and an information recording apparatus, such as a DVD recorder, an information recording method.

BACKGROUND ART

For example, in the information recording medium, such as a CD and a DVD, as described in patent documents 1 and 2 or the like, there are developed a multiple layer or multilayer type, or dual layer type optical disc and so on, in which a plurality of recording layers are laminated or stacked on the same substrate. Then, in the information recording apparatus, such as a CD recorder, for recording information onto such a dual layer type (i.e. two-layer type) optical disc, the information is recorded into a recording layer (referred to as a "L0 layer" in this application, as occasion demands), located on the front or the closest side as viewed from the emission or irradiation side of laser light, in a rewritable method or irreversible change recording method by irreversible change recording heat by using heat or the like, by focusing the L0 layer with the laser light for recording. Moreover, the information is recorded into a recording layer (referred to as a "L1 layer" in this application), located on the rear of the L0 layer as viewed from the irradiation side of the laser light, in a rewritable method or irreversible change-recording method by irreversible change recording heat by using heat or the like, by focusing the L1 layer with the laser light through the L0 layer.

Moreover, in this type of optical disc or the like, the optimum power of a recording power is set by an OPC (Optimum Power Calibration) process, depending on the type of the optical disc and the type and recording rate of the information recording/reproducing apparatus, and so on. That is, the calibration is performed for the recording power. By this, it is possible to realize an appropriate recording operation which responds to variation in characteristics of the information recording surface of the optical disc. For example, if the optical disc is loaded and a writing command is inputted, data for test writing is recorded into an OPC area, with sequentially changing the optical intensity, so that a so-called "test writing process" is performed. In particular, according to the patent document 1, the OPC area is provided for each of the two recording layers, and a technology of performing the OPC process for each of the two layers is disclosed.

Patent document 1: Japanese Patent Application Laying Open NO. 2000-311346

Patent document 2: Japanese Patent Application Laying Open NO. 2001-23237

DISCLOSURE OF INVENTION

Object to be Solved by the Invention

However, out of such two-layer type information recording media, in an information recording medium of a "parallel type or parallel method" in which the directions of track paths are the same in the two recording layers, for example, if a series of content information, such as a movie, is continuously recorded into the two recording layers, upon the recording thereof, it is necessary to return an optical pickup which has reached the most outer circumference of the disc after the recording in the L0 layer is ended, to the most inner circumferential side of the disc before the recording in the L1 layer is started, and to restart the recording in the L1 layer. Moreover, if the series of content information, such as a movie, is recorded in this manner, upon the reproduction thereof, it is necessary to return the optical pickup which has reached the most outer circumference of the disc after the reproduction in the L0 layer is ended, to the most inner circumferential side of the disc before the reproduction in the L1 layer is started, and to restart the reproduction in the L1 layer. Thus, there is such a technical problem that uninterrupted reproduction is not easy in terms of time. For example, if a reproduction buffer is set to be huge, it is possible to perform the uninterrupted reproduction, in changing the recording layer which is the target of such reproduction; however, it is extremely disadvantage in practice to incorporate the huge buffer only for this purpose, from the viewpoint of cost or the like. In addition, there is also such a problem that even if record information in which interruption is allowed is recorded or reproduced, when the recording layer is actually changed, it takes an extremely long time.

On the other hand, out of such two-layer type information recording media, in an information recording medium of an "opposite type or opposite method" in which the directions of track paths are opposite in the two recording layers, for example, a "PCA (Power Calibration Area)", which is an exclusive area for performing the OPC process in the L0 layer, is set to be an area on the most inner circumferential side of the disc, which is near the start point of the track path in the L0 layer. In the same manner, the PCA area in the L1 layer is set to be an area on the most outer circumferential side of the disc, which is near the start point of the track path in the L1 layer. However, in the case of such construction, if the OPC process is collectively performed for both the L0 layer and the L1 layer, it is necessary to displace the optical pickup, located near the most inner circumference of the disc after the OPC process is ended in the L0 layer, to near the most outer circumference of the disc before the OPC process is started in the L1 layer, and to restart the OPC process in the L1 layer. Therefore, there is such a technical problem that it takes an extremely long time for the OPC process. On the contrary, if the OPC process is separately performed for the L0 layer and the L1 layer, after the OPC process in the L0 layer, the recording is performed in the L0 layer, and when the recording in the L0 layer is ended, the OPC process is performed in the L1 layer, and after that, the recording is performed in the L1 layer. However, this causes such a technical problem that it takes an extremely long time in changing the recording layer during the recording operation.

In order to solve the above-mentioned conventional problems, it is therefore an object of the present invention to provide a multilayer type information recording medium on which test writing can be efficiently performed and the record information can be efficiently recorded, into each recording layer, and an information recording apparatus and an information recording method capable of efficiently recording the information onto such an information recording medium.

Means for Solving the Object

In order to solve the above-mentioned object, an information recording medium according to claim 1 of the present invention is an information recording medium in a disc shape, provided with: a first recording layer having (I) a first test writing area to test-write therein first test-write information for calibration of laser light for recording, along a first track path directed from an inner circumferential side to an outer circumferential side of the information recording medium, by irradiating the laser light thereto, and (II) a first recording area to record therein first record information along the first track path, by irradiating the laser light thereto, in this order from the inner circumferential side; and a second recording layer, located on a rear of the first recording layer as viewed from an irradiation side of the laser light and having (I) a second test writing area to test-write therein second test-write information for calibration of the laser light, along a second track path directed from the outer circumferential side to the inner circumferential side, by irradiating the laser light thereto, and (II) a second recording area to record therein second record information along the second track path, by irradiating the laser light thereto, in this order from the inner circumferential side.

In order to solve the above-mentioned object, an information recording apparatus according to claim 7 of the present invention is an information recording apparatus for recording first information and second information onto an information recording medium in a disc shape, provided with: a first recording layer having to record therein the first information along a first track path directed from an inner circumferential side to an outer circumferential side of the information recording medium, by irradiating laser light for recording thereto; and a second recording layer, located on a rear of the first recording layer as viewed from an irradiation side of the laser light, to record therein the second information along a second track path directed from the outer circumferential side to the inner circumferential side of the information recording medium, by irradiating the laser light thereto, in this order from the inner circumferential side, the information recording apparatus provided with: a writing device for writing the first information into the first recording layer by irradiating the laser light to focus on the first recording layer and writing the second information into the second recording layer by irradiating the laser light to focus on the second recording layer; a test-writing control device for controlling the writing device to test-write first test-write information for calibration of the laser light, into the first recording layer as one portion of the first information, and to test-write second test-write information for calibration of the laser light, into the second recording layer as one portion of the second information; and a recording control device for controlling the writing device (I) to record first record information into the first recording layer, along the first track path as another portion of the first information, on the outer circumferential side of an area in which the first test-write information is test-written, by using the laser light calibrated on the basis of the first test-write information, and (II) to record second record information into the second recording layer, along the second track path as another portion of the second information, on the outer circumferential side of an area in which the second test-write information is test-written, by using the laser light calibrated on the basis of the second test-write information, after the first and second test-write information are test-written by the test-writing control device.

In order to solve the above-mentioned object, an information recording method according to claim 14 of the present invention is an information recording method in an information recording apparatus for recording first information and second information onto an information recording medium in a disc shape, provided with: a first recording layer having to record therein the first information along a first track path directed from an inner circumferential side to an outer circumferential side of the information recording medium, by irradiating laser light for recording thereto; and a second recording layer, located on a rear of the first recording layer as viewed from an irradiation side of the laser light, to record therein the second information along a second track path directed from the outer circumferential side to the inner circumferential side of the information recording medium, by irradiating the laser light thereto, in this order from the inner circumferential side, the information recording apparatus provided with: a writing device for writing the first information into the first recording layer by irradiating the laser light to focus on the first recording layer and writing the second information into the second recording layer by irradiating the laser light to focus on the second recording layer, the information recording method provided with: a test-writing control process of controlling the writing device to test-write first test-write information for calibration of the laser light, into the first recording layer as one portion of the first information, and to test-write second test-write information for calibration of the laser light, into the second recording layer as one portion of the second information; and a recording control process of controlling the writing device (I) to record first record information into the first recording layer, along the first track path as another portion of the first information, on the outer circumferential side of an area in which the first test-write information is test-written, by using the laser light calibrated on the basis of the first test-write information, and (II) to record second record information into the second recording layer, along the second track path as another portion of the second information, on the outer circumferential side of an area in which the second test-write information is test-written, by using the laser light calibrated on the basis of the second test-write information, after the first and second test-write information are test-written by the test-writing control process.

These effects and other advantages of the present invention become more apparent from the following embodiments and example.

recording medium of the present invention.

Figure 3:
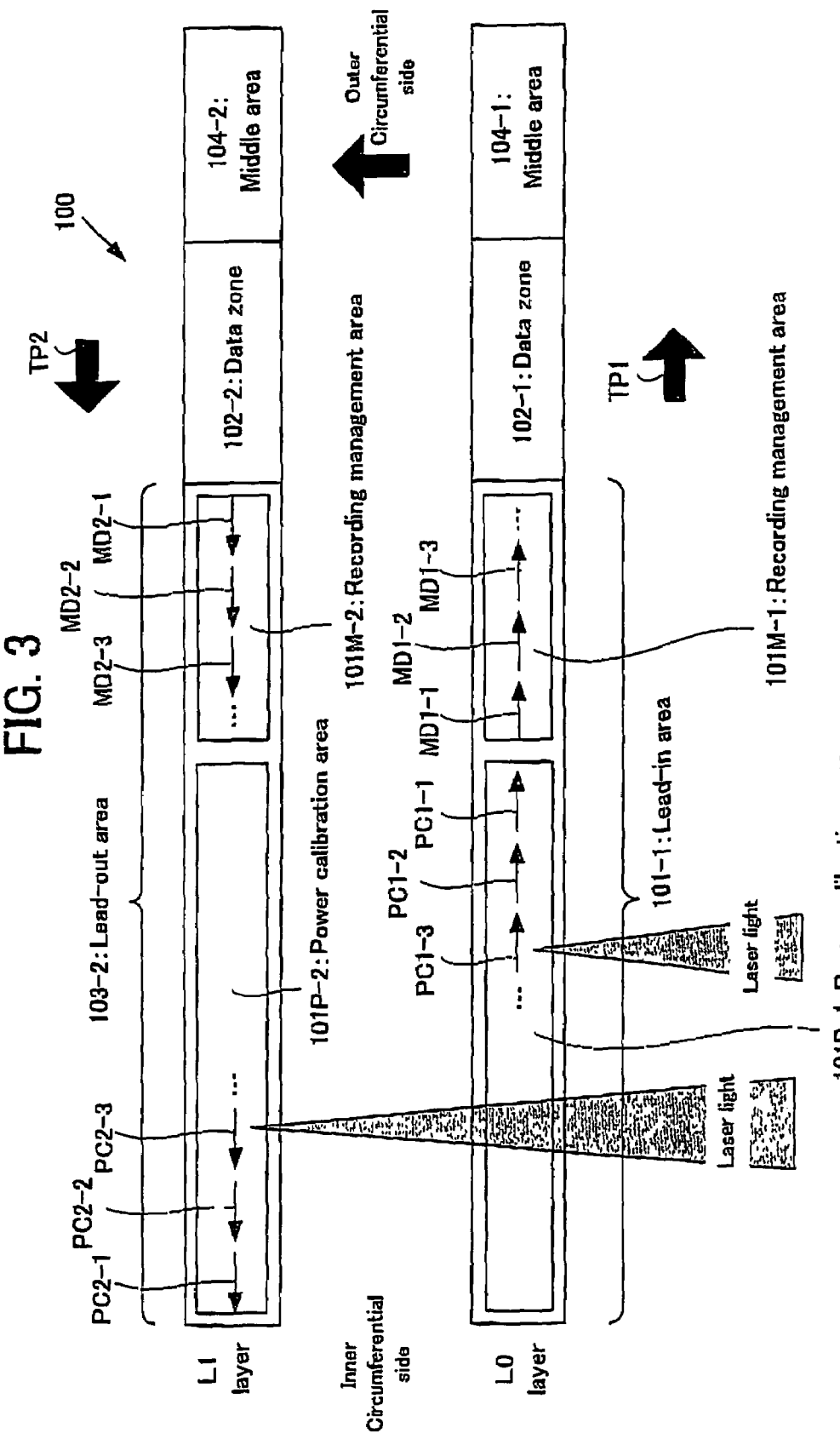

FIG. 3 is a data structural view conceptually showing the data structure of the optical disc and an area used in an OPC process, according to the first example of the information recording medium of the present invention.

Figure 4:
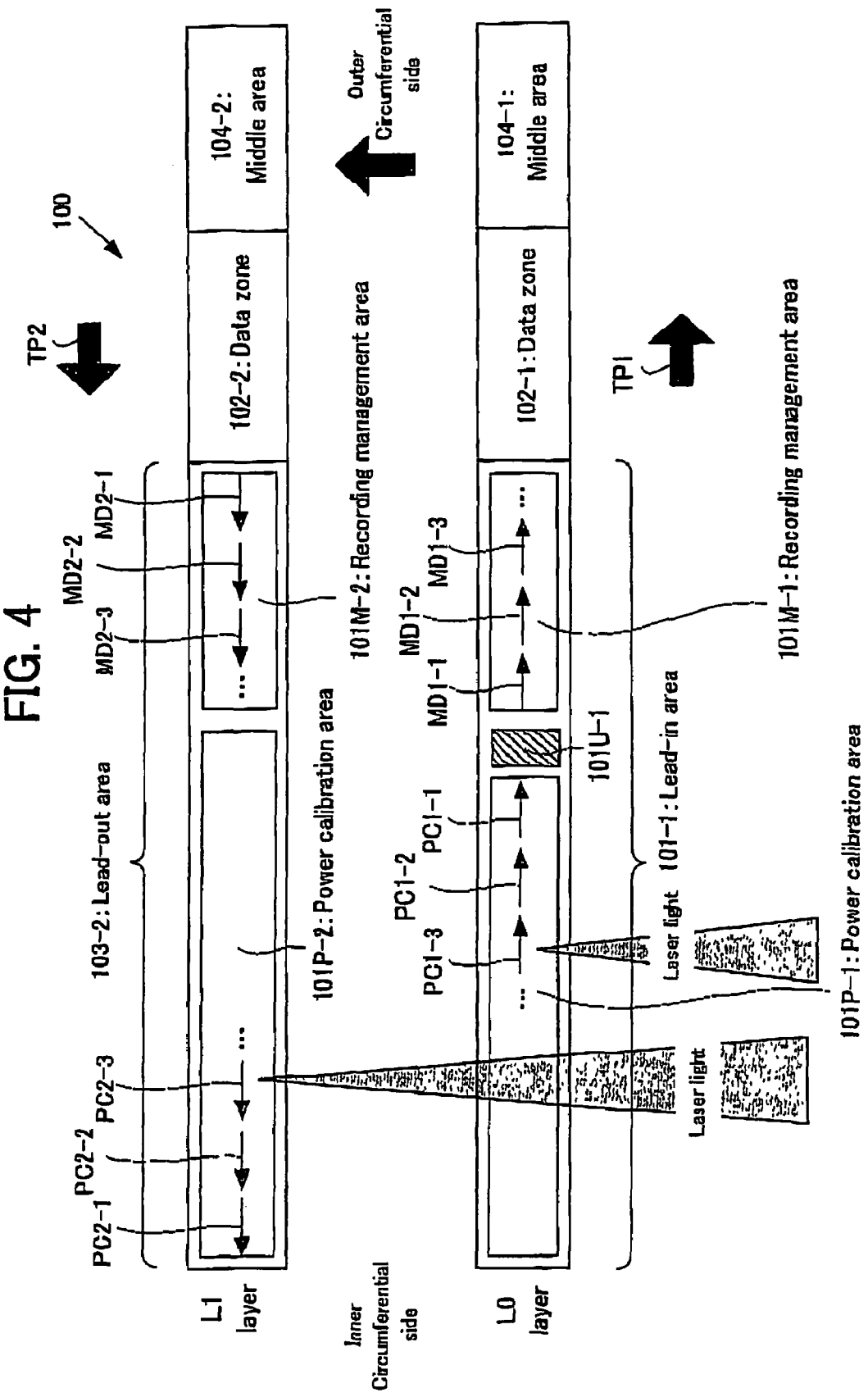

FIG. 4 is a data structural view conceptually showing the data structure of the optical disc and the area used in the OPC process, according to a second example of the information recording medium of the present invention.

Figure 5:
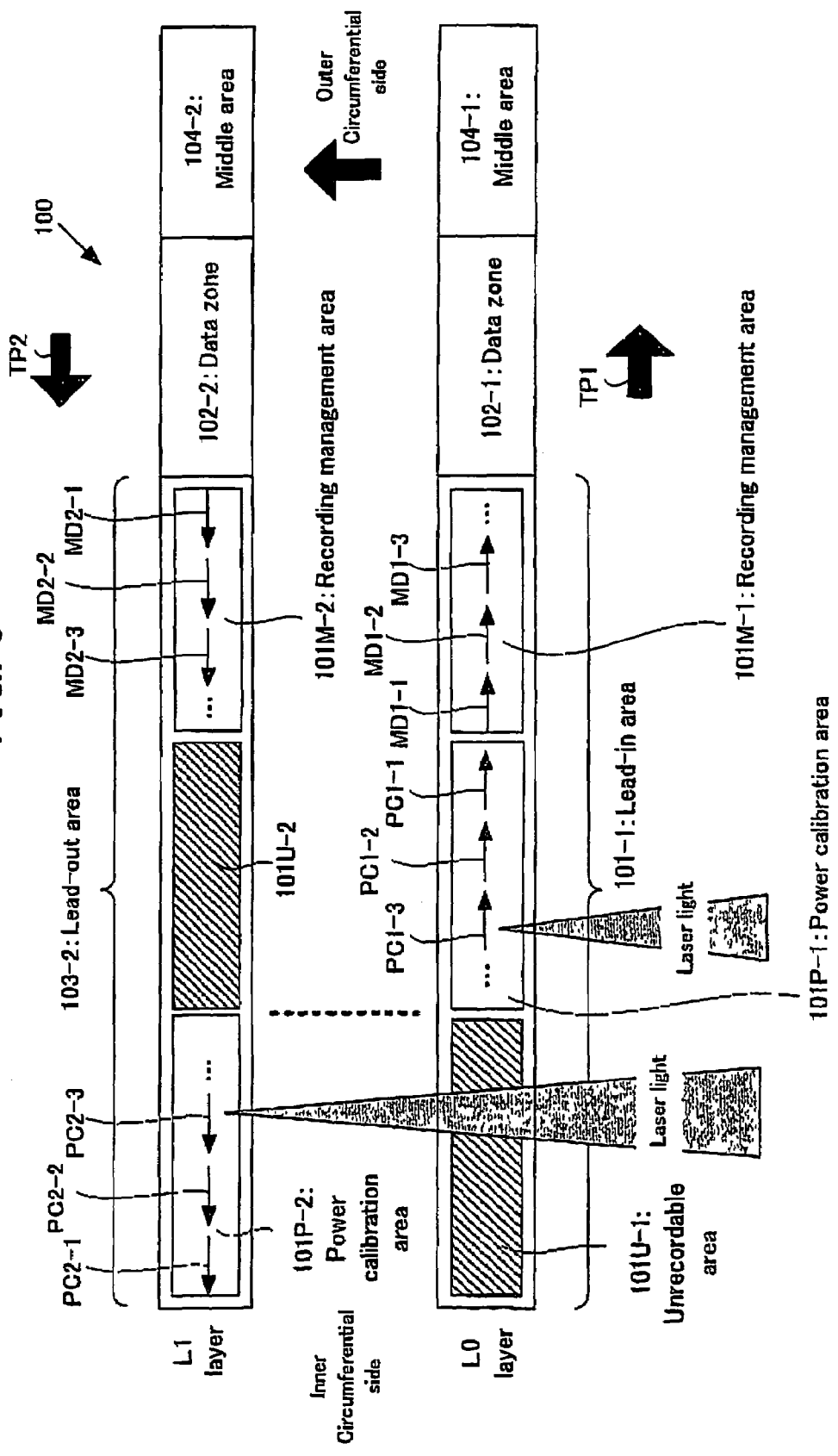

FIG. 5 is a data structural view conceptually showing the data structure of the optical disc and the area used in the OPC process, according to a third example of the information recording medium of the present invention.

Figure 6:
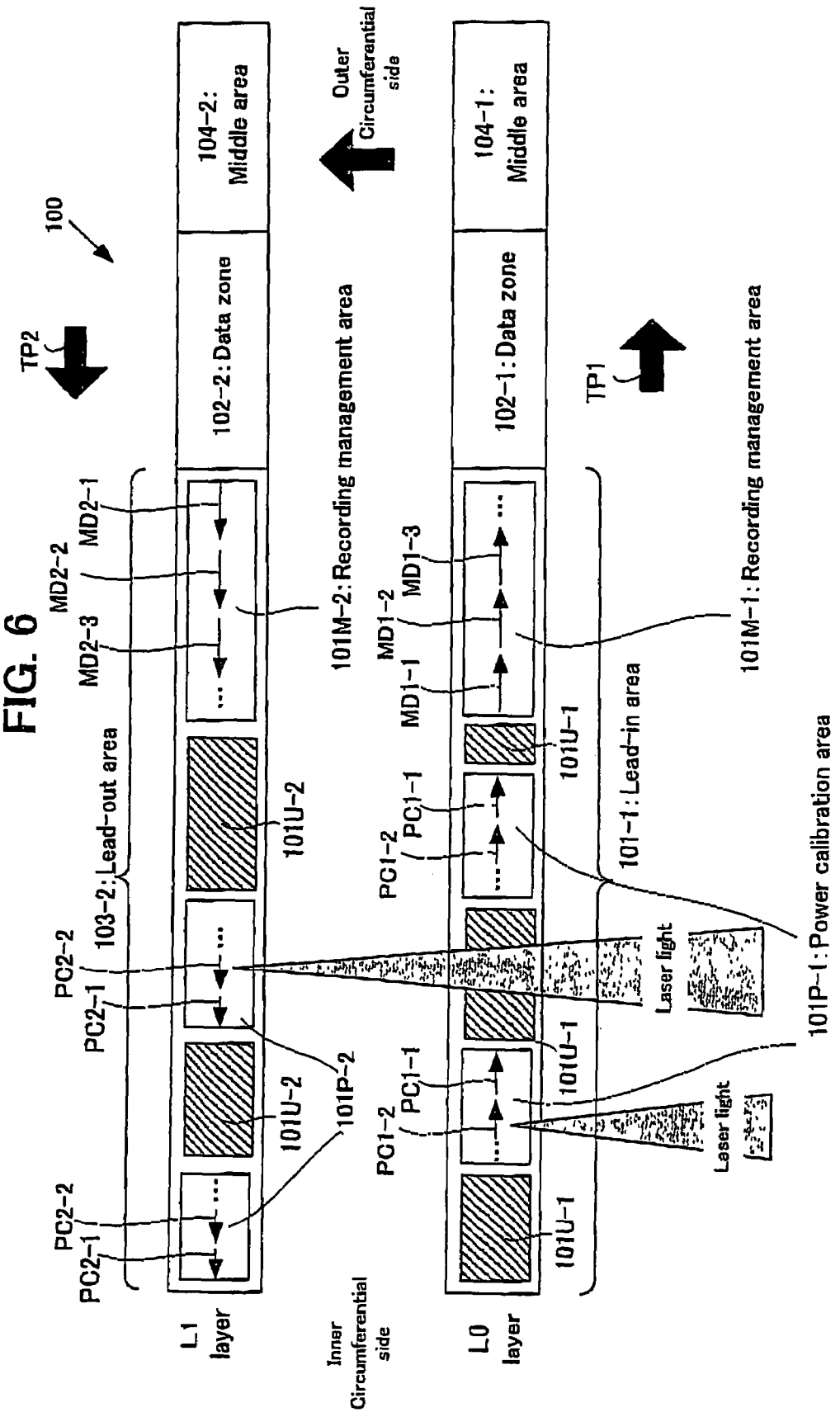

FIG. 6 is a data structural view conceptually showing the data structure of the optical disc and the area used in the OPC process, according to a fourth example of the information recording medium of the present invention.

Figure 7:
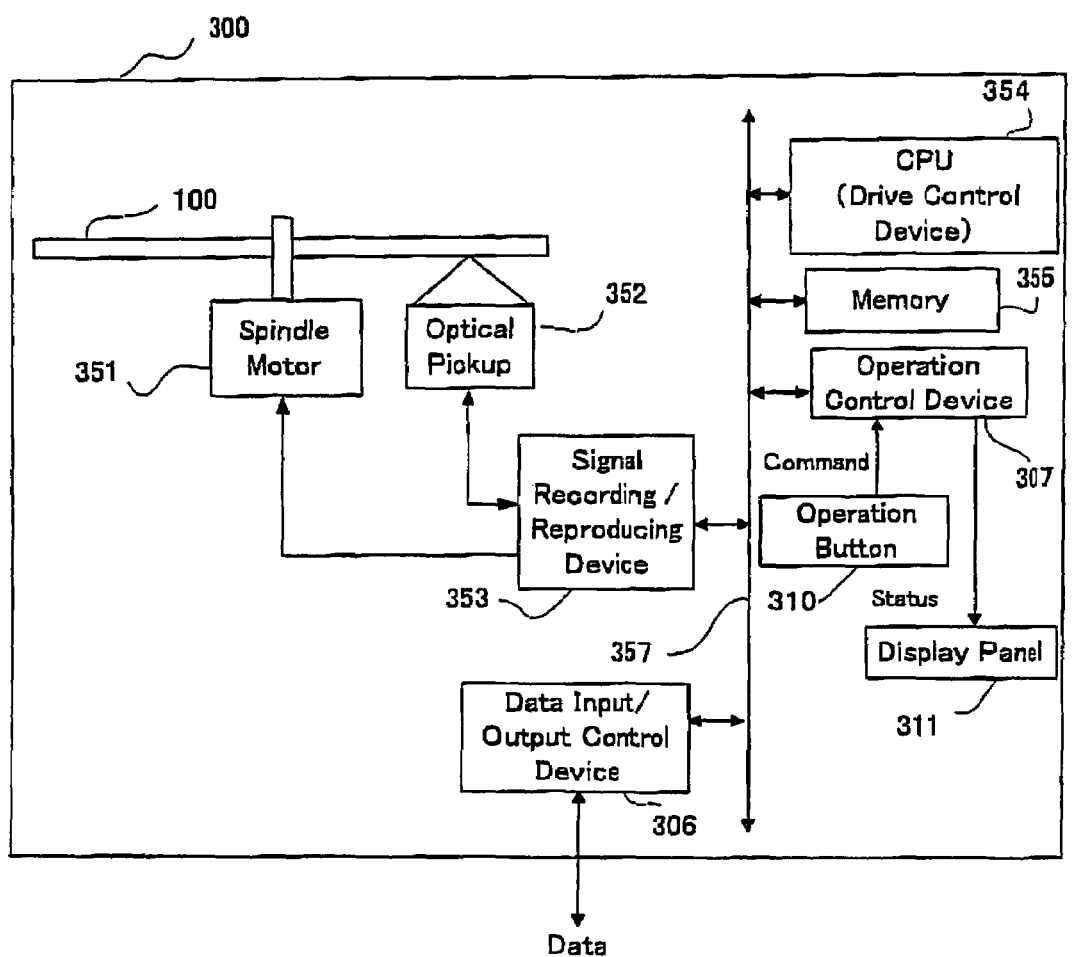

FIG. 7 is a block diagram showing an information recording/reproducing apparatus in an example of the information recording apparatus of the present invention.

Figure 8:
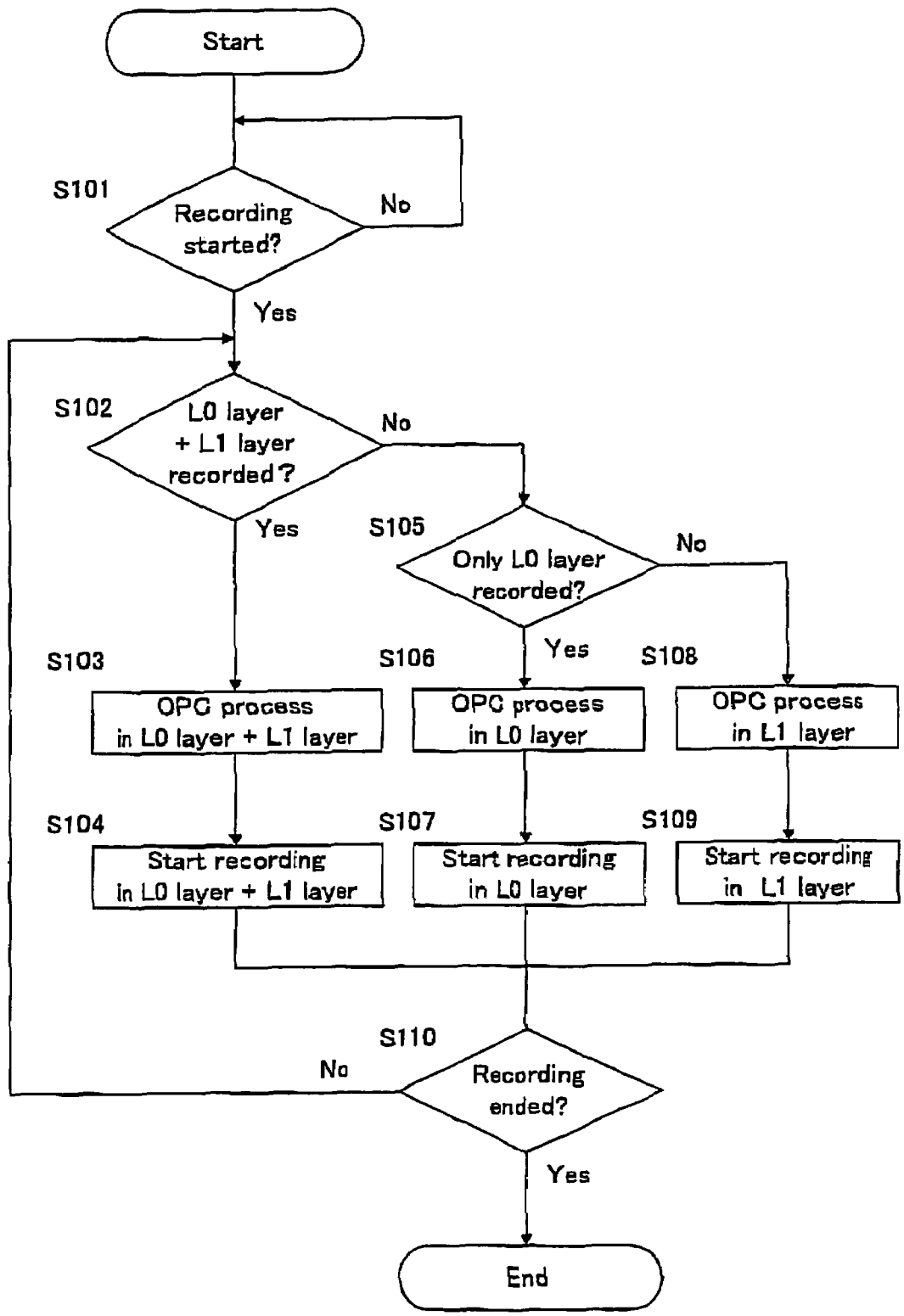

FIG. 8 is a flowchart showing the recording operation and the OPC process of the optical disc in the example of the information recording apparatus of the present invention.

DESCRIPTION OF REFERENCE CODES

1 Center hole
10 Track
11 ECC block
100 Optical disc
101 (101-1) Lead-in area
102-1 (102-2) Data zone
103 (103-2) Lead-out area
101P-1 (101P-2) Power calibration area
101M-1 (101M-2) Recording management area
101U-1 Unrecordable area of L0 layer
101U-2 Unrecordable area of L1 layer
104-1 (104-2) Middle area
106 Transparent substrate
107 First recording layer
109 Wobble
108 Semitransparent reflective film
205 Middle layer
207 Second recording layer
208 Reflective film
300 Information recording/reproducing apparatus
306 Data input/output control device
307 Operation control device
310 Operation button
311 Display panel
351 Spindle motor
352 Optical pickup
353 Signal recording/reproducing device
354 CPU (drive control device)
355 Memory
GT Groove track
LT Land track
LB Laser light
LP Land pre-pit
PC1-1 to PC1-n Test written area in the first OPC process to the n-th OPC process in L0 layer
PC2-1 to PC2-n Test written area in the first OPC process to the n-th OPC process in L1 layer
MD1-1 to MD1-n area used for the first to the n-th recording and reproduction of control information in L0 layer
MD2-1 to MD2-n area used for the first to the n-th recording and reproduction of control information in L1 layer

BEST MODE FOR CARRYING OUT THE INVENTION

Embodiment of Information Recording Medium

An embodiment according to the information recording medium of the present invention is an information recording medium in a disc shape, provided with: a first recording layer having (I) a first test writing area to test-write therein first test-write information for calibration of laser light for recording, along a first track path directed from an inner circumferential side to an outer circumferential side of the information recording medium, by irradiating the laser light thereto, and (II) a first recording area to record therein first record information along the first track path, by irradiating the laser light thereto, in this order from the inner circumferential side; and a second recording layer, located on a rear of the first recording layer as viewed from an irradiation side of the laser light and having (I) a second test writing area to test-write therein second test-write information for calibration of the laser light, along a second track path directed from the outer circumferential side to the inner circumferential side, by irradiating the laser light thereto, and (II) a second recording area to record therein second record information along the second track path, by irradiating the laser light thereto, in this order from the inner circumferential side.

According to the embodiment of the information recording medium of the present invention, for example, the first and second recording layers area stacked or laminated on one side of a disc-shaped substrate, by which a two-layer type or multilayer type information recording medium, such as a DVD and an optical disc, is constructed. In the first recording layer, it is possible to record the first record information, such as audio information, video information, and content information, along the first track path, into the first recording area which is a user data area, for example. In the second recording layer, it is possible to record the second record information, such as audio information, video information, and content information, along the second track path, into the second recording area which is a user data area, for example.

In particular, the first track path is directed from the inner circumferential side to the outer circumferential side of the disc-shaped substrate. On the contrary, the second track path is directed from the outer circumferential side to the inner circumferential side. Namely, in the two-layer type or multilayer type information recording medium, continuous recording in the "opposite method" can be performed in which the track paths are directed in the opposite direction in the two recording layers. Therefore, if the recording is continuously performed from the end edge (i.e. the edge on the outer circumferential side) of the first recording layer to the start edge (i.e. the edge on the outer circumferential side) of the second recording layer, it is hardly necessary or not necessary at all to change the irradiation position of the laser light in the surface of the substrate in the radial direction, in changing the recording layer as being the target of a recording process or reproduction process related to the record information, which allows quick layer jump (i.e. a layer change operation). It is extremely useful in practice in the sense that this facilitates the uninterrupted reproduction without requiring a special buffer function to change the recording layer.

Incidentally, in the case of "parallel method" in which the track paths are directed in the same direction in the two recording layers, the end edge of the first recording layer and the start edge of the second recording layer are located on the different sides. Thus, in changing the recording layer as being the target of the recording process or reproduction process related to the record information, it is necessary to change the irradiation position of the laser light in the surface of the substrate, from the outer circumferential side to the inner circumferential side, which makes the quick layer jump difficult or impossible. Thus, in the case of the parallel method, it is difficult or impossible to perform the uninterrupted reproduction, in recording the record information, such as a movie, as the continuous first and second record information. On the contrary, according to the embodiment based on the opposite method as described above, the quick layer jump is possible in recording the continuous record information into the two recording layers, which allows the uninterrupted reproduction, relatively easily.

Moreover, in the embodiment, in the first recording layer, the first test-write information, such as a predetermined OPC pattern, is recorded into the first test writing area, such as a PCA (Power Calibration Area), located on the inner circumferential side of the first recording area. On the other hand, in the second recording layer, the second test-write information, such as a predetermined OPC pattern, is recorded into the second test writing area, such as a PCA (Power Calibration Area), located on the inner circumferential side of the second recording area. In this manner, the first and second test writing areas are both located on the inner circumferential side of the disc-shaped substrate, so that if the test writing is collectively performed in the two test writing areas before or immediately before the first and second record information is recorded, it is hardly necessary or not necessary at all to change the irradiation position of the laser light in the surface of the substrate in the radial direction, in changing the recording layer as being the target of the recording process or reproduction process related to the test-write information. This allows the quick layer jump in the test writing, and it is possible to greatly reduce a total time length required for the test writing of the two test-write information.

Incidentally, even in the case of the opposite method, if the test writing area of the first recording layer is located on the inner circumferential side which is the start side of the track path in accordance with a common arrangement and if the test writing area of the second recording layer is located on the outer circumferential side which is the start side of the track path in accordance with the common arrangement, it is necessary to change the irradiation position of the laser light in the surface of the substrate from the inner circumferential side to the outer circumferential side when the test-write information is collectively test-written into the two recording layers. Thus, it takes time for the layer jump, and the total time length for the test writing becomes extremely long. On the contrary, according to the embodiment as described above, it is possible to properly perform the test writing, in the test-writing into the two recording layers, and looking overall, short-time test writing can be performed.

As explained above, according to the information recording medium in the embodiment, in the first recording layer and the second recording layer, the track paths are directed in the opposite direction, and moreover, the test writing areas are arranged or aligned on the same side (i.e. the inner circumferential side of the disc), so that the uninterrupted reproduction can be relatively easily performed in the continuous reproduction of the record information, and moreover, the test writing can be collectively and quickly performed.

In one aspect of the embodiment of the information recording medium of the present invention, in the first recording area, first address information which indicates addresses sequentially given from the inner circumferential side to the outer circumferential side, is recorded in advance along the first track path, and in the second recording area, second address information which indicates addresses sequentially given from the outer circumferential side to the inner circumferential side, is recorded in advance along the second track path.

According to this aspect, in the first recording area, the first address information, such as (i) absolute address information given to the entire information recording medium and the entire first recording layer and (ii) relative information given on the basis of several reference positions, is recorded along the first track path. Specifically, for example, pre-pit address information is recorded by a land pre-pit which is embossed in a land track, or the like. As directed from the inner circumferential side to the outer circumferential side, an address value in the first recording area is increased. On the other hand, in the second recording area, the second address information, such as (i) absolute address information given to the entire information recording medium and the entire second recording layer and (ii) relative information given on the basis of several reference positions, is recorded along the second track path. Specifically, for example, the pre-pit address information is recorded by the land pre-pit which is embossed in a land track, or the like. As directed from the outer circumferential side to the inner circumferential side, an address value in the second recording area is increased. Therefore, the recording or reproduction, and the test writing, performed along the track path, as described above, can be certainly performed in accordance with the address information.

In another aspect of the embodiment of the information recording medium of the present invention, in the first test writing area, an area portion of a predetermined size is used in order of the outer circumferential side to the inner circumferential side in each operation of writing the first test-write information, and in the second test writing area, an area portion of a predetermined size is used in order of the inner circumferential side to the outer circumferential side in each operation of writing the second test-write information.

According to this aspect, in the first test writing area, the area portion of a predetermined size is used in order of the outer circumferential side to the inner circumferential side in each operation of writing the first test-write information, such as a series of OPC operation performed before the recording is started each time, for example. Thus, in the n-th writing operation (n is a natural number of two or more) of the test-write information, it is easier to search for the start end of the area portion written for the (n−1)-th time along the first track path. By this, it is possible to easily specify the area in which the n-th writing operation will be performed, in a way of backing away or searching backward only by the predetermined size. In particular, if the address information is recorded along the first track path, it is possible to easily specify the start end of the area portion written for the (n−1)-th time by using the address, and further to specify the area in which the n-th writing operation will be performed by using the address. On the other hand, even in the second test writing area, in the same manner, in the n-th writing operation of the test-write information, it is easier to search for the start end of the area portion written for the (n−1)-th time along the second track path. By this, it is possible to easily specify the area in which the n-th writing operation will be performed.

In another aspect of the embodiment of the information recording medium of the present invention, the first recording layer further has a first control information area in which first control information for controlling at least one of a recording operation and a reproduction operation of the first record information is recorded, on the outer circumferential side of the first test writing area and on the inner circumferential side of the first recording area, and the second recording layer further has a second control information area in which second control information for controlling at least one of a recording operation and a reproduction operation of the second record information is recorded, on the outer circumferential side of the second test writing area and on the inner circumferential side of the second recording area.

According to this aspect, in the first recording layer, various first control information is recorded along the first track path into the first control information area, such as a RMA (Recording Management Area), located between the first test writing area and the first recording area. In the second recording layer, various second control information is recorded along the second track path into the second control information area, such as a RMA, located between the second test writing area and the second recording area. Therefore, upon the recording and the reproduction of the information recording medium, the first and second control information is recorded or reproduced before or after the recording or reproduction of the first or second record information. In particular, it is possible to perform complicate and advanced reproduction/recording operations, on the basis of the first and second control information. At this time, the first control information area is located between the first test writing area and the first recording area, and the second control information area is located between the second test writing area and the second recording area. Thus, it is possible to easily perform the uninterrupted reproduction in the continuous reproduction of the record information, which is related to the above-mentioned embodiment, and there is little chance to block the effect that the test writing can be collectively and quickly performed.

In another aspect of the embodiment of the information recording medium of the present invention, the first recording layer further has a space area in which first address information which indicates an address in the first track path is recorded, which is adjacent to the outer circumferential side of the first test writing area, and in which other information is not recorded.

According to this aspect, in the space area of the first recording layer, the first address information is recorded along the first track path. Specifically, for example, the pre-pit address information is recorded by the land pre-pit which is embossed in the land track, or the like. Therefore, in accessing the first recording area through the first test writing area along the first track path, even if the address information in the first test writing area is damaged by the test writing, the address information can be confirmed in the space area before reaching to the first recording area; namely, the current reading position of an optical pickup or the like can be specified. Therefore, in the access operation performed along the first track path, it is possible to access the start portion of the first recording area without difficulty. Incidentally, even if there is the first control information area, in the same manner, in accessing the first recording area through the first test writing area along the first track path, it is possible to access the start portion of the first control information area without difficulty.

In another aspect of the embodiment of the information recording medium of the present invention, the first test writing area and the second test writing area are away from each other in a radial direction of the information recording medium as viewed from a normal direction of the information recording medium, or at least an area portion of the first test writing area into which the first test-write information is written and at least an area portion of the second test writing area into which the second test-write information is written are away from each other in the radial direction.

According to this aspect, the first test writing area and the second test writing area are away from each other in the radial direction, so that the laser light when the test writing is performed in the second test writing area is not transmitted through the first test writing area because it is transmitted through the space area in the first recording layer, for example. Thus, it is possible to prevent such a situation that the recording state of the first test writing area, i.e. whether the first test writing area is recorded or unrecorded with the test-write information, causes inaccurate test writing in the second test writing area. If the first test writing area and the second test writing area are not away from each other, optical characteristics, such as transmittance, are changed in the first test writing area due to the difference of whether it is recorded or unrecorded, so that the test writing in the second test writing area, performed through this area, becomes more or less inaccurate.

Alternatively, at least the area portion of the first test writing area into which the first test-write information is written and at least the area portion of the second test writing area into which the second test-write information is written are away from each other in the radial direction. Thus, the laser light when the test writing is performed in the second test writing area is not transmitted through the area in which the first test-write information is recorded because it is transmitted through the space area in the first recording layer, for example. Therefore, it is possible to prevent such a situation that the recording state of the first test writing area causes inaccurate test writing in the second test writing area, even if the first test writing area and the second test writing area are overlapped. Incidentally, in this case, the test writing may be performed in the first test writing area such that the space area exists between area portions in which the test-write information are actually written, and in the same manner, the test writing may be performed in the second test writing area such that the space area exists between area portions in which the test-write information are actually written. Moreover, the test writing may be performed such that the space area is in a complementary positional relationship or alternating positional relationship between the first and second test writing areas, in the surface of the substrate.

Embodiment of Information Recording Apparatus

An embodiment according to the information recording apparatus of the present invention is an information recording apparatus for recording first information and second information onto an information recording medium in a disc shape, provided with: a first recording layer to record therein the first information along a first track path directed from an inner circumferential side to an outer circumferential side of the information recording medium, by irradiating laser light for recording thereto; and a second recording layer, located on a rear of the first recording layer as viewed from an irradiation side of the laser light, to record therein the second information along a second track path directed from the outer circumferential side to the inner circumferential side of the information recording medium, by irradiating the laser light thereto, the information recording apparatus provided with: a writing device for writing the first information into the first recording layer by irradiating the laser light to focus on the first recording layer and writing the second information into the second recording layer by irradiating the laser light to focus on the second recording layer; a test-writing control device for controlling the writing device to test-write first test-write information for calibration of the laser light, into the first recording layer as one portion of the first information, and to test-write second test-write information for calibration of the laser light, into the second recording layer as one portion of the second information; and a recording control device for controlling the writing device (I) to record first record information into the first recording layer, along the first track path as another portion of the first information, on the outer circumferential side of an area in which the first test-write information is test-written, by using the laser light calibrated on the basis of the first test-write information, and (II) to record second record information into the second recording layer, along the second track path as another portion of the second information, on the outer circumferential side of an area in which the second test-write information is test-written, by using the laser light calibrated on the basis of the second test-write information, after the first and second test-write information are test-written by the test-writing control device.

According to the embodiment according to the information recording apparatus of the present invention, it is possible to efficiently perform the test writing process, collectively, for the two recording layers, by using the writing device including an optical pickup or the like, for example, with respect to the embodiment of the information recording medium of the present invention described above, under the control of the test writing control device including a CPU (Central Processing Unit) or the like, for example. Namely, the first and second test writing areas are both located on the inner circumferential side of the disc-shaped substrate, so that the test writing can be collectively performed for the two recording layers before or immediately before the first and second record information is recorded. By this, it is hardly necessary or not necessary at all to change the irradiation position of the laser light in the surface of the substrate in the radial direction, in changing the recording layer as being the target of the recording process related to the test-write information, which allows the quick layer jump in the test writing. As a result, it is possible to greatly reduce a total time length required for the test writing with regard to the two recording layers.

Moreover, it is possible to efficiently perform the recording operation in the opposite method, by using the writing device including an optical pickup or the like, for example, under the control of the recording control device including a CPU or the like, for example. Namely, it is possible to continuously perform the recording, from the end edge (i.e. the edge on the outer circumferential side) of the first recording layer to the start edge (i.e. the edge on the circumferential side) of the second recording layer. In this case, particularly, it is hardly necessary or not necessary at all to change the irradiation position of the laser light in the surface of the substrate, in changing the recording layer as being the target of the recording process related to the record information, which allows the quick layer jump (i.e. the layer change operation). This facilitates the uninterrupted reproduction without requiring a special buffer function to change the recording layer, in recording the record information, such as a movie, as the continuous first and second record information.

As explained above, according to the information recording apparatus in the embodiment, the uninterrupted reproduction can be relatively easily performed in the continuous reproduction of the record information, and moreover, the test writing can be collectively and quickly performed.

In one aspect of the embodiment of the information recording apparatus of the present invention, in the first recording area, first address information which indicates addresses sequentially given from the inner circumferential side to the outer circumferential side, is recorded in advance along the first track path, in the second recording area, second address information which indicates addresses sequentially given from the outer circumferential side to the inner circumferential side, is recorded in advance along the second track path, the information recording apparatus is further provided with an address reading device for reading the first and second address information, and the recording control device controls the writing device (I) to record the first record information along the first track path in accordance with the read first address information and (II) to record the second record information along the second track path in accordance with the read second address information.

According to this aspect, the recording and the test writing in the first recording layer can be certainly performed along the first path track, under the control of the recording control device, by that the first address information is read by the address reading device including an optical pickup or the like, for example. Moreover, the recording and the test writing in the second recording layer can be certainly performed along the second path track, under the control of the recording control device, by that the second address information is read by the address reading device.

In this aspect, it may be constructed such that first recording layer has a space area in which the first address information is recorded, which is adjacent to the outer circumferential side of the first test writing area, and in which other information is not recorded, and the address reading device reads the first address information by accessing the space area.

By such construction, in accessing the first recording area through the first test writing area along the first track path, even if the address information in the first test writing area is damaged by the test writing, the address information can be read by the address reading device in the space area before reaching to the first recording area. Namely, the current reading position of an optical pickup or the like can be specified. Therefore, in the access operation performed along the first track path, it is possible to access the start portion of the first recording area without difficulty.

Incidentally, as for the second recording layer, since the second test writing area is located in a more downstream portion of the second track path than the second recording area, even if the test writing of the test-write information causes unreadable address information or the like in the second track path, there is no disadvantage to access the second recording area by accessing each address position in the second recording area along the second track path from the outer circumferential side of the second recording layer. Namely, in the second recording layer, the space area is unnecessary. Moreover, in the second recording layer, even if there is the second control information area, the space area is unnecessary as well.

In another aspect of the embodiment of the information recording apparatus of the present invention, the information recording apparatus is further provided with an area detecting device for detecting areas in which the first and second test-write information is already test-written, and the test-writing control device controls the writing device to set a start position at each time of writing the first and second test-write information in accordance with the areas detected by the area detecting device.

According to this aspect, the areas in which the first and second test-write information is already test-written are detected by the area detecting device including an optical pickup or the like, for example. After that, under the control of the test-writing control device, the start position at each time of writing the first and second test-write information is set in accordance with the areas detected in this manner. Therefore, even if the address information in the first or second test writing area is damaged because the test writing is performed, it is possible to perform each time of test writing, from the appropriate start position.

In another aspect of the embodiment of the information recording apparatus of the present invention, the test-writing control device controls the writing device to use an area portion of a predetermined size in order of the outer circumferential side to the inner circumferential side in each operation of writing the first test-write information, and controls the writing device to use an area portion of a predetermined size in order of the inner circumferential side to the outer circumferential side in each operation of writing the second test-write information.

According to this aspect, in the n-th writing operation (n is a natural number of two or more) of the test-write information, it is easier to search for the start end of the area portion written for the (n−1)-th time along the first track path. By this, it is possible to easily specify the area in which the n-th writing operation will be performed, in a way of backing away or searching backward only by the predetermined size.

In another aspect of the embodiment of the information recording apparatus of the present invention, the recording control device (I) controls the writing device to record first control information for controlling at least one of a recording operation and a reproduction operation of the first record information, on the outer circumferential side of the area in which the first test-write information is test-written and on the inner circumferential side of an area in which the first record information is recorded, in the first recording layer, and (II) controls the writing device to record second control information for controlling at least one of a recording operation and a reproduction operation of the second record information, on the outer circumferential side of the area in which the second test-write information is test-written and on the inner circumferential side of an area in which the second record information is recorded, in the second recording layer.

According to this aspect, the first and second control information is recorded or reproduced before or after the recording of the first or second record information. In particular, it is possible to perform complicate and advanced reproduction/ recording operations, on the basis of the first and second control information.

In another aspect of the embodiment of the information recording apparatus of the present invention, the test-writing control device (I) controls the writing device to use such areas that the first test writing area and the second test writing area are away from each other in a radial direction of the information recording medium as viewed from a normal direction of the information recording medium, or (II) controls the writing device to use such areas that (II-1) at least an area portion of the first test writing area into which the first test-write information is written and (II-2) at least an area portion of the second test writing area into which the second test-write information is written are away from each other in the radial direction.

According to this aspect, the laser light when the test writing is performed in the second test writing area is not transmitted through the first test writing area or the area portion in which the first test-write information is recorded, because it is transmitted through the space area in the first recording layer, for example. Thus, it is possible to prevent such a situation that the recording state of the first test writing area, i.e. the recording state of whether the first test writing area is recorded or unrecorded with the test-write information, causes inaccurate test writing in the second test writing area. As a result, it is possible to preferably record the first record information and the second record information by using the laser light calibrated in accordance with an accurate test-writing result.

Embodiment of Information Recording Method

An embodiment according to the information recording method of the present invention is an information recording method in an information recording apparatus for recording first information and second information onto an information recording medium in a disc shape, provided with: a first recording layer to record therein the first information along a first track path directed from an inner circumferential side to an outer circumferential side of the information recording medium, by irradiating laser light for recording thereto; and a second recording layer, located on a rear of the first recording layer as viewed from an irradiation side of the laser light, to record therein the second information along a second track path directed from the outer circumferential side to the inner circumferential side of the information recording medium, by irradiating the laser light thereto, the information recording apparatus provided with: a writing device for writing the first information into the first recording layer by irradiating the laser light to focus on the first recording layer and writing the second information into the second recording layer by irradiating the laser light to focus on the second recording layer, the information recording method provided with: a test-writing control process of controlling the writing device to test-write first test-write information for calibration of the laser light, into the first recording layer as one portion of the first information, and to test-write second test-write information for calibration of the laser light, into the second recording layer as one portion of the second information; and a recording control process of controlling the writing device (I) to record first record information into the first recording layer, along the first track path as another portion of the first information, on the outer circumferential side of an area in which the first test-write information is test-written, by using the laser light calibrated on the basis of the first test-write information, and (II) to record second record information into the second recording layer, along the second track path as another portion of the second information, on the outer circumferential side of an area in which the second test-write information is test-written, by using the laser light calibrated on the basis of the second test-write information, after the first and second test-write information are test-written by the test-writing control process.

According to the embodiment according to the information recording method of the present invention, as in the case of the above-mentioned embodiment according to the information recording apparatus of the present invention, the uninterrupted reproduction can be relatively easily performed in the continuous reproduction of the record information, and moreover, the test writing can be collectively and quickly performed.

Incidentally, even in the embodiment according to the information recording method of the present invention, it is possible to adopt the same aspects as the various aspects of the above-mentioned embodiment according to the information recording apparatus of the present invention.

These effects and other advantages of the present invention become more apparent from the following examples.

As explained above, according to the embodiment according to the information recording medium of the present invention, in the first recording layer and the second recording layer, the track paths are directed in the opposite direction, and moreover, the test writing areas are arranged or aligned on the same side, so that it is possible to efficiently perform the test writing and to efficiently record the record information, in each recording layer. Moreover, according to the embodiment according to the information recording apparatus of the present invention, it is provided with: the test-writing control device; and the recording control device. According to the embodiment according to the information recording method of the present invention, it is provided with: the test-writing control process; and the recording control process. Thus, it is possible to efficiently perform the test writing and to efficiently record the record information, onto the multilayer type information recording medium.

EXAMPLES

First Example

Next, with reference to FIG. 1 to FIG. 3, an optical disc according to the first example of the information recording medium will be discussed in detail.

At first, with reference to FIG. 1, the basic structure of the optical disc in the first example will be discussed. FIG. 1 shows the basic structure of the optical disc according to the first example of the information recording medium of the present invention, wherein the upper part is a substantial plan view showing the optical disc having a plurality of areas and the corresponding lower part is a schematic conceptual view showing a recording area structure in the radial direction.

Figure 1:
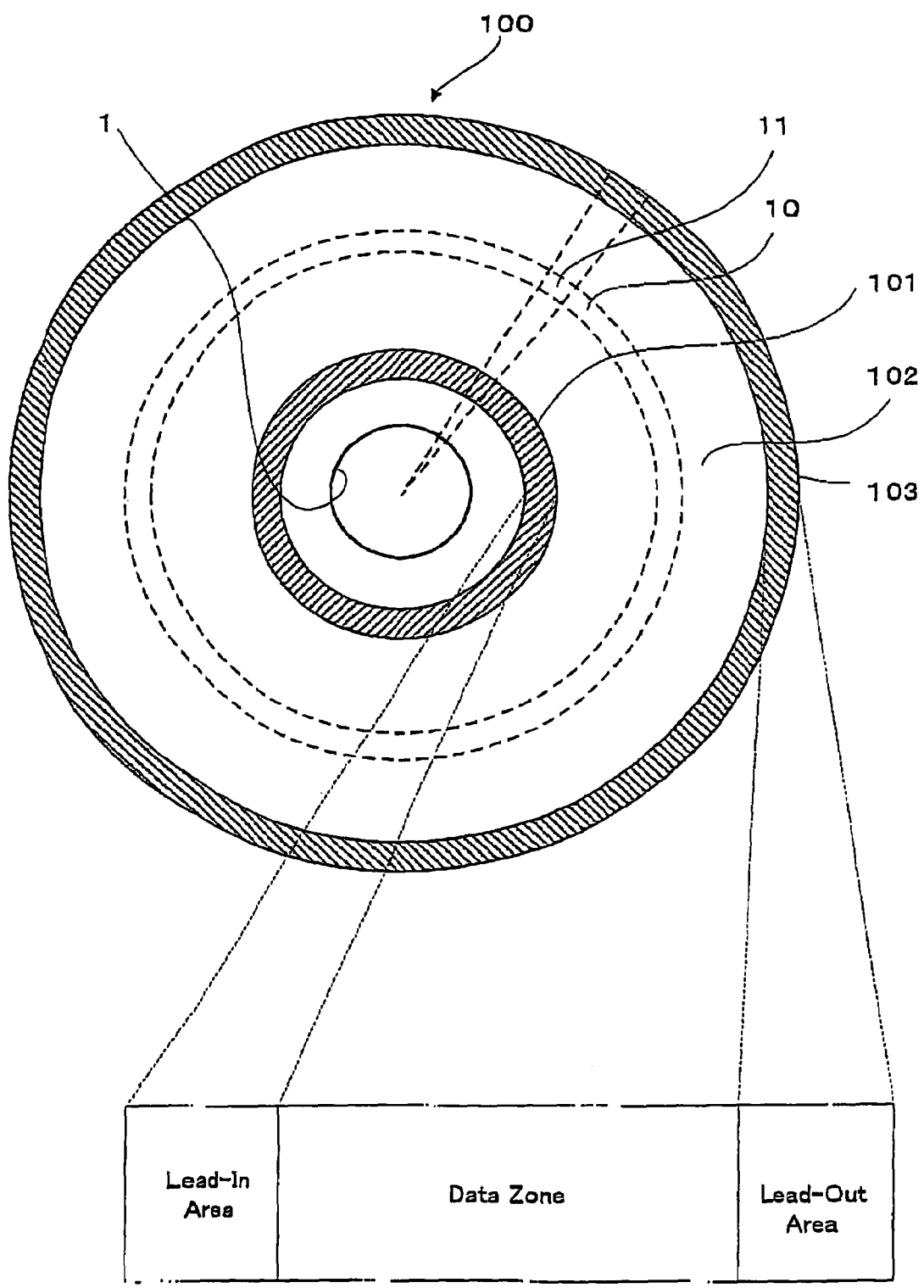
FIG. 1 shows the basic structure of an optical disc according to a first example of the information recording medium of the present invention, wherein the upper part is a substantial plan view showing the optical disc having a plurality of areas and the corresponding lower part is a schematic conceptual view showing a recording area structure in the radial direction.

As shown in FIG. 1, an optical disc 100 has a recording surface on a disc main body with a diameter of about 12 cm, as is a DVD. On the recording surface, the optical disc 100 is provided with: a lead-in area 101; a data zone 102; and a lead-out area 103, which are associated with the example, from the inner circumferential side to the outer circumferential side, with a center hole 1 as the center. Then, in each recording area, a track or tracks 10, such as a groove track and a land track, are alternately placed, spirally or concentrically, with the center hole 1 as the center. On the track 10, data is divided and recorded by a unit of ECC block 11. The ECC block 11 is a data management unit by a pre-format address in which record information is error-correctable.

Incidentally, the present invention is not particularly limited to the optical disc having these three areas. For example, even if the lead-in area 101 or the lead-out area 103 does not exist, a data structure explained below can be constructed. Moreover, as described later, the lead-in area 101 or the lead-out area 103 may be further segmentized.

Next, with reference to FIG. 2, the physical structure of the optical disc in the example will be explained. More specifically, the optical disc 100 in the example is constructed as a two-layer type optical disc in which a plurality of data zones 102 or the like are formed in a laminated structure. FIG. 2 is a partially enlarged perspective view showing a recording surface of the optical disc according to the first example of the information recording medium of the present invention.

Figure 2:
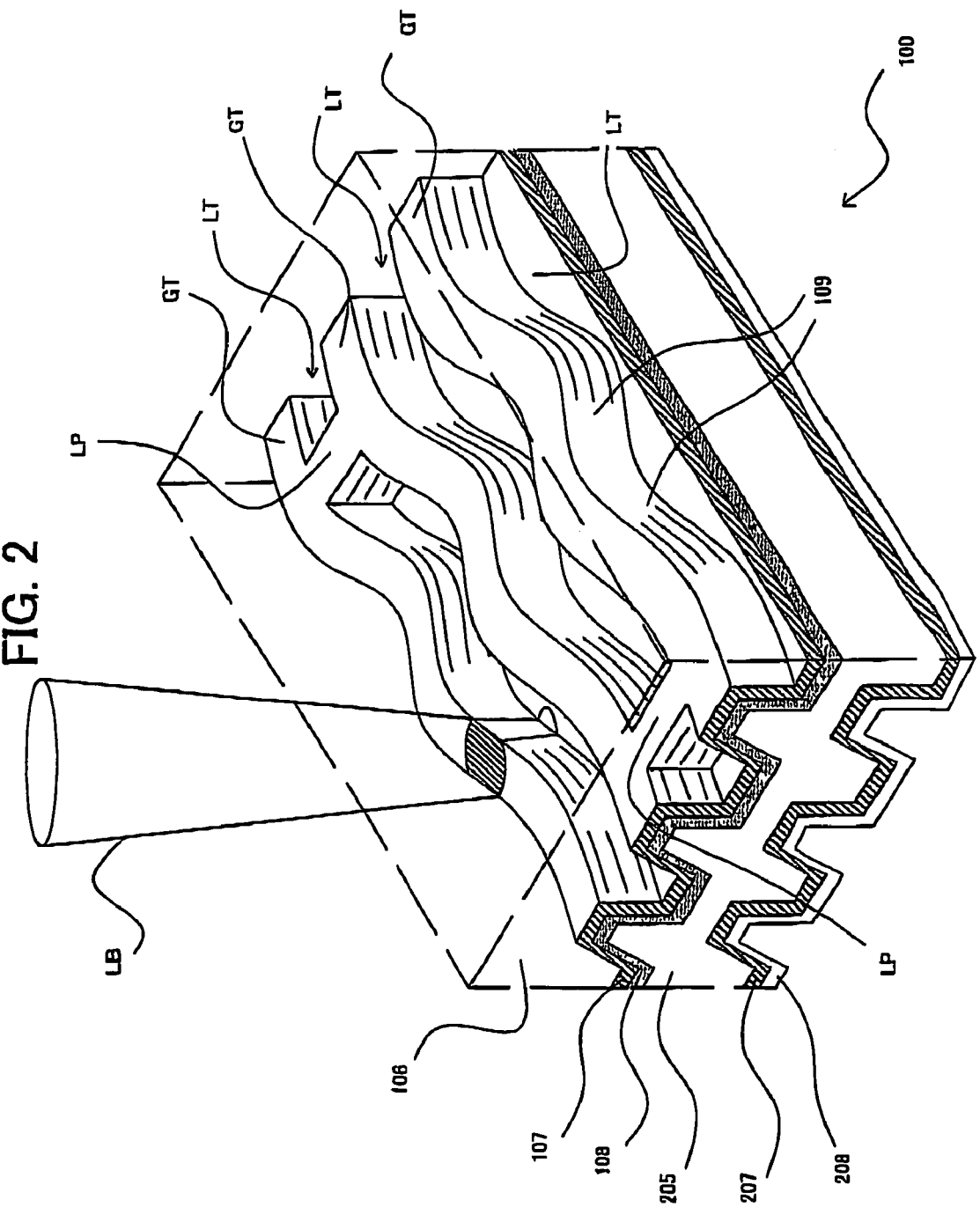
FIG. 2 is a partially enlarged perspective view showing a recording surface of the optical disc according to the first example of the information recording medium of the present invention.

In FIG. 2, in the example, in the optical disc 100, a first recording layer 107 of a phase change type or of an irreversible change recording type by heat or the like which constitutes an information recording surface is stacked or laminated on (on the lower side of, in FIG. 2) a disc-shaped transparent substrate 106, and a semitransparent reflective film 108 is stacked or laminated thereon (on the lower side in FIG. 2). On the information recording surface which is the surface of the first recording layer 107, a groove track GT and a land track LT are alternately formed. Incidentally, upon the recording and the reproduction of the optical disc 100, as shown in FIG. 2, for example, the groove track GT is irradiated with laser light LB through the transparent substrate 106. For example, upon the recording, by irradiating the laser light LB with a recording laser power, writing by a phase change into the first recording layer 107 or irreversible change recording by heat is performed, in accordance with the record data. On the other hand, upon the reproduction, by irradiating the laser light LB with a reproduction laser power weaker than the recording laser power, the record data written in the first recording layer 107 is read.

In the example, the groove track GT is wobbled with a certain amplitude and at a certain spatial frequency. In other words, the groove track GT is wobbled, and the cycle of the wobble 109 is set to a predetermined value. On the land track LT, there is formed an address pit which is referred to as a land pre-pit LP and which indicate pre-format address information. By virtue of the two addressing (i.e. the wobble 109 and the land pre-pit LP), it is possible to obtain information necessary for data recording, such as a recording address, disc rotation control during the recording, or generation of a recording clock. Incidentally, it is also possible to record the pre-format address information in advance, by modulating the wobble 109 of the groove track GT in a predetermined modulation method, such as frequency modulation and phase modulation.

Particularly in the example, a second recording layer 207 is formed on (on the lower side of, in FIG. 2) the semitransparent reflective film 108, and a reflective film 208 is formed thereon (on the lower side in FIG. 2). The second recording layer 207 is constructed such that the recording and reproduction of a phase change type or of an irreversible change recording type by heat or the like can be performed by irradiating it with the laser light LB through the transparent substrate 106, the first recording layer 107, and the semitransparent reflective film 108, in substantially the same manner of the first recording layer 107. The second recording layer 207 and the reflective film 208 may be coated and formed on the transparent substrate 106 on which the first recording layer 107 and the semitransparent reflective film 108 or the like are formed. Alternatively, after coated and formed on different substrates, and the second recording layer 207 and the reflective film 208 may be bonded or pasted on the transparent substrate 106. Incidentally, there is provided a transparent middle layer 205 made of a transparent adhesive or the like, between the semitransparent reflective film 108 and the second recording layer 207, as occasion demands, in accordance with the production method.

Upon the recording/reproduction of such a two-layer type optical disc 100, the recording/reproduction in the first recording layer 107 or the second recording layer 207 is performed, depending on which recording layer has the focus position of laser light LB.

Incidentally, the optical disc 100 in the example is not limited to a two-layer single sided type, i.e., a dual layer type, as shown in FIG. 2, but may be one-layer double sided type, i.e., a double sided type, or a two-layer double sided type, i.e., a dual layer double sided type. Furthermore, the optical disc 100 in the example is not limited to the optical disc having the two recording layers, as described above, but may be an optical disc of a multilayer type which has three or more layers.

Next, with reference to FIG. 3, a detailed explanation will be given to the data structure of the optical disc and an area used for the OPC process, in the first example will be discussed. FIG. 3 is a data structural view conceptually showing the data structure of the optical disc and an area used in an OPC process, according to the first example of the information recording medium of the present invention.

As shown in FIG. 3, the optical disc 100 has two recording layers, i.e., an L0 layer (i.e. a recording layer corresponding to the first recording layer 107 in FIG. 1 and FIG. 2) and an L1 layer (i.e. a recording layer corresponding to the second recording layer 207 in FIG. 1 and FIG. 2).

The L0 layer is provided with: a lead-in area 101-1; a data zone 102-1; and a middle area 104-1, from the inner circumferential side to the outer circumferential side. The lead-in area 101-1 is provided with: a power calibration area 101P-1, which constitutes one example of the "first test writing area" of the present invention; and a recording management area 101M-1, which constitutes one example of the "first control information area" of the present invention.

On the other hand, the L1 layer is provided with: a middle area 104-2; a data zone 102-2; and a lead-out area 103-2, from the outer circumferential side to the inner circumferential side The lead-out area 103-2 is provided with: a power calibration area 101P-2, which constitutes one example of the "second test writing area" of the present invention; and a recording management area 101M-2, which constitutes one example of the "second control information area" of the present invention.

Specifically, the power calibration area 101P-1 (101P-2) is an area used for a process of detection of an optimum recording laser power (i.e. calibration of a recording laser power), i.e., a so-called OPC process. In particular, the power calibration area 101P-1 is used for the detection of the optimum recording laser power of the L0 layer, and the power calibration area 101P-2 is used for the detection of the optimum recording laser power of the L1 layer. More specifically, after the test writing of an OPC pattern is completed, the test-written OPC pattern is reproduced, and the reproduced OPC pattern is subsequently sampled, to thereby detect the optimum recording laser power. Moreover, the value of the optimum recording laser power obtained by the OPC may be stored into a storage apparatus, such as a memory described later, mounted on the information recording apparatus side, or recorded into a management information recording area or the like of the information recording medium.

Then, the laser light for the OPC process is irradiated onto the L0 layer and the L1 layer, from the side of a not-illustrated substrate, i.e., from the lower to the upper side in FIG. 3, by an optical pickup of the information recording apparatus described later, and the focal (or focus) distance thereof or the like is controlled. At the same time, the travel distance and direction in the radial direction of the optical disc 100 are controlled.

Particularly, in the two-layer type optical disc 100 in the first example, continuous recording in the "opposite method" can be performed in which the track paths are directed in the opposite direction in the two recording layers, in the recording or reproduction process of the data. More specifically, under the "opposite method", the optical pickup of an information recording/reproducing apparatus described later is displaced in the L0 layer in the direction of a first track path TP1 shown with a right-pointing arrow in a thick line in FIG. 3, i.e. from the inner circumferential side to the outer circumferential side of the disc-shaped substrate. Then, layer jump, i.e. focusing from the L0 layer to the L1 layer, is performed. Then, the optical pickup is displaced in the L1 layer in the direction of a second track path TP2 shown with a left-pointing arrow in a thick line in FIG. 3, i.e. from the outer circumferential side to the inner circumferential side.

Moreover, particularly in the first example, the OPC process is collectively performed in tandem, in the recording operation in the L0 layer and the L1 layer.

Specifically, each time of the OPC process in the power calibration area 101P-1 of the L0 layer is performed in order in the opposite direction of the first track path TP1.

More specifically, the first OPC process is performed from the most outer circumferential side of the power calibration area 101P-1 by using an area PC1-1, and the second OPC process is performed by using an area PC1-2, and the third OPC process is performed by using an area PC1-3, sequentially. As described above, in the L0 layer, the power calibration area 101P-1 is consumed, i.e. damaged, toward the inner circumferential side by the OPC process. Incidentally, in each time of the OPC process in the L0 layer, the test writing of the OPC pattern and the reproduction of the test-written OPC pattern are performed in the direction of the first track path TP1.

On the other hand, each time of the OPC process in the power calibration area 101P-2 of the L1 layer is performed in order in the opposite direction of the second track path TP2.

More specifically, the first OPC process is performed from the most inner circumferential side of the power calibration area 101P-2 by using an area PC2-1, and the second OPC process is performed by using an area PC2-2, and the third OPC process is performed by using an area PC2-3, sequentially. As described above, in the L1 layer, the power calibration area 101P-2 is consumed, i.e. damaged, toward the outer circumferential side by the OPC process. Incidentally, in each time of the OPC process in the L1 layer, the test writing of the OPC pattern and the reproduction of the test-written OPC pattern are performed in the direction of the second track path TP2.

Incidentally, the recording and the reproduction of control information in the recording management area 101M-1 of the L0 layer does not damage address information or the like, as opposed to the OPC process, and are performed in the same direction of the first track path TP1.

More specifically, the first recording and reproduction of the control information is performed from the inner circumferential side of the recording management area 101M-1 by using an area MD1-1, and the recording and reproduction of the control information is performed by using an area MD1-2, and the third recording and reproduction of the control information is performed by using an area MD1-3, sequentially. As described above, in the L0 layer, the recording management area 101M-1 is used toward the outer circumferential side.

On the other hand, the recording and the reproduction of control information in the recording management area 101M-2 of the L1 layer does not damage the address information or the like, as opposed to the OPC process, and are performed in the same direction of the second track path TP2.

More specifically, the first recording and reproduction of the control information is performed from the outer circumferential side of the recording management area 101M-2 by using an area MD2-1, and the recording and reproduction of the control information is performed by using an area MD2-2, and the third recording and reproduction of the control information is performed by using an area MD2-3, sequentially. As described above, in the L1 layer, the recording management area 101M-2 is used toward the inner circumferential side.

As explained above, according to the information recording medium in the first example, the track paths area opposite in the L0 layer and the L1 layer, and moreover, the power calibration areas 101P-1 (and 101P-2) are arranged on the same side (i.e. on the inner circumferential side of the disc). Thus, the uninterrupted reproduction can be performed, relatively easily, upon the continuous reproduction of the record information, and further, the OPC process can be collectively performed, quickly.

Moreover, even if the power calibration areas 101P-1 (and 101P-2) are arranged on the same side (i.e. on the inner circumferential side of the disc), the OPC process is performed from the outer circumferential side of the power calibration area 101P-1 in the L0 layer, and the OPC process is performed from the inner circumferential side of the power calibration area 101P-2 in the L1 layer. Thus, it is possible to prevent the occurrence of such a situation that the OPC processes in the L0 layer and the L1 layer influence each other, to thereby cause inaccurate test writing.

Second Example

Next, with reference to FIG. 4, a detailed explanation will be given to the data structure of the optical disc and the area used in the OPC process, according to the second example of the information recording medium of the present invention. FIG. 4 is a data structural view conceptually showing the data structure of the optical disc and the area used in the OPC process, according to the second example of the information recording medium of the present invention.

The basic structure and the OPC process in the second example of the information recording medium are substantially the same as those in the first example, explained with reference with reference to FIG. 1 to FIG. 3.

Particularly in the second example of the information recording medium, an unrecordable area 101U-1 is provided in the L0 layer, which constitutes one example of the "space area" of the present invention, in addition to the areas of the first example.

Specifically, in the unrecordable 101U-1, for example, pre-pit address information is recorded by a land pre-pit which is embossed in the land track, or the like. Therefore, in accessing the recording management area 101M-1, for example, through the power calibration area 101P-1 along the first track path TP1, even if the address information in the power calibration area 101P-1 is damaged by the test writing, the address information can be confirmed in the unrecordable area 101U-1 before reaching to the recording management area 101M-1; namely, the current reading position of the optical pickup or the like can be specified. Therefore, in the access operation performed along the first track path TP1, it is possible to access the start portion of the recording management area 101M-1 without difficulty.

Third Example

Next, with reference to FIG. 5, a detailed explanation will be given to the data structure of the optical disc and the area used in the OPC process, according to the third example of the information recording medium of the present invention. FIG. 5 is a data structural view conceptually showing the data structure of the optical disc and the area used in the OPC process, present invention. FIG. 6 is a data structural view conceptually showing the data structure of the optical disc and the area used in the OPC process, according to the fourth example of the information recording medium of the present invention.

The basic structure and the OPC process in the fourth example of the information recording medium are substantially the same as those in the first example, explained with reference with reference to FIG. 1 to FIG. 3.

Particularly in the fourth example of the information recording medium, the power calibration area 101P-1 of the L0 layer and the power calibration area 101P-2 of the L1 layer are disposed to have a complementary positional relationship or alternating positional relationship. Namely, in accordance with the power calibration area 101P-1 of the L0 layer, the unrecordable area 101U-2 is disposed in a same radial position in the L1 layer. In the same manner, in accordance with the power calibration area 101P-2 of the L1 layer, the unrecordable area 101U-1 is disposed in a same radial position in the L0 layer.

Since the fourth example is constructed in this manner, it is possible to receive the effects of the second example and the third example, simultaneously and certainly.

(Information Recording/Reproducing Apparatus)

Next, with reference to FIG. 7, the structure and the operation of the information recording apparatus in the present invention will be discussed. Particularly, in the example, the information recording apparatus of the present invention is applied to an information recording/reproducing apparatus for the optical disc described above.

At first, with reference to FIG. 7, the structure of an information recording/reproducing apparatus 300 according to the example of the information recording apparatus of the present invention will be discussed. FIG. 7 is a block diagram showing the information recording/reproducing apparatus 300 according to the example of the present invention. Incidentally, the information recording/reproducing apparatus 300 has a function of recording the record data onto the optical disc 100 and a function of reproducing the record data recorded on the optical disc 100.

With reference to FIG. 7, the inner structure of the information recording/reproducing apparatus 300 will be discussed. The information recording/reproducing apparatus 300 is an apparatus for recording the information onto the optical disc 100 and reading the information recorded on the optical disc 100, under the control of a CPU 354.

The information recording/reproducing apparatus 300 is provided with: the optical disc 100; a spindle motor 351; an optical pickup 352; a signal recording/reproducing device 353; the CPU (drive control device) 354; a memory 355; a data input/output control device 306; an operation button 310; a display panel 311; and a bus 357.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 is intended to perform the recording/reproduction with respect to the optical disc 100, and is provided with a semiconductor laser device and a lens. More specifically, the optical pickup 352 irradiates the optical disc 100 with a light beam, such as a laser beam, as reading light with a first power upon reproduction, and as writing light with a second power upon recording, with it modulated. In particular, the optical pickup 352 constitutes one example of the "writing device", the "address reading device", and the "area detecting device" of the present invention.

The signal recording/reproducing device 353 controls the spindle motor 351 and the optical pickup 352, to thereby perform the recording/reproduction with respect to the optical disc 100. More specifically, the signal recording/reproducing device 353 is provided with: a laser diode (LD) driver; a head amplifier; and the like, for example. The laser diode driver (LD driver) drives a not-illustrated semiconductor laser device located in the optical pickup 352. The head amplifier amplifies the output signal of the optical pickup 352, i.e. the reflective light of a light beam, and outputs the amplified signal.

Particularly in the example, the signal recording/reproducing device 353 drives the not-illustrated semiconductor laser disposed in the optical pickup 352, in order to determine an optimum laser power in the recording and reproduction processes of the OPC pattern, together with a not-illustrate timing generator or the like, under the control of the CPU 354, in the OPC process.

The memory 355 is used in the whole data processing and the OPC process or the like on the information recording/reproducing apparatus 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as recording equipment is stored; a buffer for compression/decompression of video data; a RAM area into which a parameter required for a program operation is stored; and the like.

The CPU (drive control device) 354 is connected to the signal recording/reproducing device 353 and the memory 355 through the bus 357, and controls the entire information recording/reproducing apparatus 300 by giving an instruction to each controlling device. Normally, software for operating the CPU 354 is stored in the memory 355. In particular, the CPU 354 constitutes one example of the "test-writing control device" and the "recording control device" or the like of the present invention.

The data input/output control device 306 controls the input/output of the data from the exterior with respect to the information recording/reproducing apparatus 300, to thereby perform storage to and export from the data buffer on the memory 355. If the input/output of the data is a video signal, the data input/output control device 306 compresses (encodes) the data received from the exterior into a MPEG format upon the data input, and outputs it to the memory 355. Moreover, the data input/output control device 306 decompresses (decodes) the data in the MPEG format received from the memory 355, and outputs it to the exterior.

The operation control device 307 receives an operation instruction and performs display with respect to the information recording/reproducing apparatus 300, and transmits an instruction by the operation button 310, such as an instruction to record or reproduce, to the CPU 354. Moreover, the operation control device 307 outputs the operational state of the information recording/reproducing apparatus 300, such as during recording and during reproduction, to the display panel 310, such as a fluorescent tube.

One example of the information recording/reproducing apparatus 300, as explained above, is recorder equipment for recording and reproducing video images in household equipment. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 355, on the CPU 354.

(Flow of Recording Operation performed by Information Recording Apparatus)

Next, with reference to FIG. 8, a flow of the recording operation and the OPC process of the optical disc in the example of the information recording apparatus of the present invention will be discussed. FIG. 8 is a flowchart showing the recording operation and the OPC process of the optical disc in the example of the information recording apparatus of the present invention.

In FIG. 8, at first, if the optical disc 100 is loaded, a seek operation is performed by the optical pickup 352, under the control of the CPU 354, to obtain various management information required for the recording process with respect to the optical disc 100. On the basis of the management information, it is judged whether or not the recording operation of the data onto the optical disc 100 is started by the data input/output control device 306, in accordance with an instruction from exterior input equipment or the like, under the control of the CPU 354 (step S101). Here, if the recording operation of the data onto the optical disc 100 is started (the step S101: Yes), then, it is further judged whether the recording layer which is a recording target is the L0 layer and the L1 layer (step S102). Here, if the recording layer which is the recording target is the L0 layer and the L1 layer (the step S102: Yes), the OPC process is performed for the L0 layer and the L1 layer (step S103). Particularly, in the example, as explained above, the track paths are opposite in the L0 layer and the L1 layer, and moreover, the power calibration areas 101P-1 (and 101P-2) are arranged on the same side (i.e. on the inner circumferential side of the disc). Thus, the OPC process can be collectively performed, quickly. Moreover, after the recording, the uninterrupted reproduction can be performed, relatively easily, upon the continuous reproduction of the record information.

Then, the data is recorded into the L0 layer and the L1 layer, with the optimum recording laser power calculated in the step S103 (step S104).

On the other hand, as a result of the judgment in the step S102, if the recording layer which is the recording target is not the L0 layer and the L1 layer (the step S102: No), then, it is further judged whether or not the recording layer which is the recording target is only the L0 layer (step S105). Here, if the recording layer which is the recording target is only the L0 layer (the step S105: Yes), the OPC process is performed for the L0 layer (step S106).

Then, the data is recorded into the L0 layer, with the optimum recording laser power calculated in the step S106 (step S107).

On the other hand, if the recording layer which is the recording target is not only the L0 layer (the step S105: No), the OPC process is performed for the L1 layer (step S108).

Then, the data is recorded into the L1 layer, with the optimum recording laser power calculated in the step S108 (step S109).

Then, it is judged whether or not the recording operation of the data is ended (step S110). Here, if the recording operation of the data is ended (the step S110: Yes), the series of recording operation performed by the information recording apparatus is completed.

On the other hand, if the recording operation of the data is not ended (the step S110: No), as described above, it is judged whether the recording layer which is a recording target is the L0 layer and the L1 layer (the step S102).

On the other hand, as a result of the judgment in the step S101, if the recording operation of the data onto the optical disc 100 is not started (the step S101: No), for example, a command to start the recording operation or the like is waited for.

The present invention is not limited to the above-described examples, and various changes may be made, if desired, without departing from the essence or spirit of the invention which can be read from the claims and the entire specification. An information recording medium, an information recording apparatus, and an information recording method, all of which involve such changes, are also intended to be within the technical scope of the present invention.

INDUSTRIAL APPLICABILITY

The information recording medium, the information recording apparatus, and the information recording method according to the present invention can be applied to a multi-layer type optical disc for consumer or industrial use on which various information can be highly densely recorded, and can be applied to a recorder or a player related to the optical disc. Moreover, they can be applied to an information recording medium, an information recording apparatus or the like, which are mounted on or can be connected to various computer equipment for consumer or industrial use, for example.

The invention claimed is:

1. An information recording medium in a disc shape, comprising at least:
   a first recording layer having a first test writing area to test-write therein first test-write information for calibration of laser light for recording, by irradiating the laser light thereto; and
   a second recording layer, located on a rear of said first recording layer as viewed from an irradiation side of the laser light and having a second test writing area to test-write therein second test-write information for calibration of the laser light, by irradiating the laser light thereto, wherein
   the first test writing area and the second test writing area are away from each other in a radial direction of said information recording medium as viewed from a normal direction of said information recording medium,
   in the first test writing area, an area portion of a predetermined size is used in order in an opposite direction of a track path of the first recording layer, in each operation of writing the first test-write information, and
   in the second test writing area, an area portion of a predetermined size is used in an opposite direction of a track path of the second recording layer, in each operation of writing the second test-write information.

2. The information recording medium according to claim 1, wherein
   said first recording layer further has: a first recording area to record therein first record information by irradiating the laser light thereto; and a first control information area in which first control information for controlling at least one of a recording operation and a reproduction operation of the first record information is recorded, in which arrangement is in order of the first test writing area, the first control information area, and the first recording area from an inner circumferential side, and
   said second recording layer further has: a second recording area to record therein second record information by irradiating the laser light thereto; and a second control information area in which second control information for controlling at least one of a recording operation and a reproduction operation of the second record information is recorded, in which arrangement is in order of the second test writing area, the second control information area, and the second recording area from the inner circumferential side.

* * * * *